UNITED STATES PATENT OFFICE.

JOHN JOHNSON AND JAMES HART ROBERTSON, OF BROOKLYN, NEW YORK.

METHOD OF MAKING POROUS PLATES OR ELECTRODES.

SPECIFICATION forming part of Letters Patent No. 546,739, dated September 24, 1895.

Application filed April 2, 1895. Serial No. 544,216. (No specimens.)

*To all whom it may concern:*

Be it known that we, JOHN JOHNSON and JAMES HART ROBERTSON, citizens of the United States, residing in Brooklyn, in the county of Kings, State of New York, have invented certain new and useful Improvements in Methods of Making Porous Plates or Electrodes, of which the following is a specification.

The present invention relates to an improved method of making porous plates or electrodes.

The present invention is designed to produce mechanically what may be termed a "porous" plate—that is to say, a plate which outwardly appears to be of a solid character—is, in fact, ramified more or less throughout its entire structure with pores or cells which act to provide a greatly-enlarged surface, so that when used as an electrode in a secondary or other battery such increased surface will be exposed to the action of the electrolyte, the degree of porosity of the plate being governed by the uses to which it may be desired to adapt the plate in practice.

In carrying out the invention we take a suitable metal—such, for instance, as lead—and heat it until it is brought to a molten condition, and then add to the same a granulated or powdered and artificial or, preferably, natural porous substance—such as pumice-stone, brick-dust, kaolin, coral, and the like—such substance being also an inert substance, and thus obviating when the plate is used as an electrode in an electric battery any local action. After the addition of this granulated substance its incorporation with the metal forms a pasty mass, which may be kneaded in a manner similar to the kneading of flour-dough or in any other suitable manner that will obtain the proper incorporation and dissemination of the granulated substance throughout the mass in as even and uniform condition as is possible. The mass is then, while in this more or less pasty condition and with the added granular material, molded or pressed into a mold of the required size, according as the uses to which the plate or body is to be put may dictate. The porous substance employed, as above described, contains innumerable air-cells, the air from which is greatly expanded out into the molten metal by the heat of the latter, thereby producing air-spaces therein, or what may be termed an "aerated" condition thereof. While the mixture is in the mold, the mold and the material therein may be subjected to a slightly-elevated temperature, sufficient to enable the exterior surface of the plate or body to be made or become smoother than it ordinarily would without such additional heating. The now completed porous plate or body may be removed from the mold and subjected to other treatment or employed directly in any of the arts, as may be desired. It is advantageous, but not necessary, to add to the lead in the first instance a small quantity of tin or bismuth in order that the temperature at which the pasty condition of the mass will obtain will be lowered a few degrees below that of lead alone. When the plate is to be used as an electrode of a battery, the finished plate may be subjected to such action as may be necessary to provide or form throughout its mechanically-produced pores or cells the so-called "active material," which in the present knowledge of storage-batteries is necessary to the use of such plate. Thus the porous plate may be placed in an electrolytic fluid, be connected in circuit with an electric generator, and be subjected to the action of an electric current, so that there will be formed throughout its body such active material in the usual manner.

In practice we have used the metal and porous inert substance in about equal proportions in bulk, or, in other words, a plate weighing, say, one pound fourteen ounces will contain about three-quarters of an ounce of granulated pumice-stone, such pumice-stone being of the size of ordinary white sand, and such as is sold in the market and known as "coarsely granulated pumice-stone." The quantity of porous substance added to the pasty mass may be raised according to the degree of porosity desired. On account of the great porosity of this plate or body and the large surface attained and the practicability of obtaining the very large dissemination of the active material throughout the entire body of the electrode, it is obvious that fewer plates may be used than usual and yet obtain the same result, and with the added result of a much lighter battery. The porosity of the plate is so great that we have found that a plate of the size of four inches by five inches by three-eighths of an inch thick will absorb about one ounce of liquid.

While we have mentioned the use of the porous plate for an electrode of a secondary or other battery, it is obvious that it has other uses in the arts.

It may be stated that the porous inert substance added to the metal to obtain the porosity described may remain a part of the finished plate or body, as we have found in practice that its presence does not detract from the useful functions of such plate.

We employ the word "metal" to mean an elemental substance—such, for instance, as metallic lead—as distinguished from the oxide of a metal.

We do not in this application claim a porous plate consisting of a metal in its metallic form mechanically mixed with an inert porous substance, the same forming the subject-matter of our application, Serial No. 559,541, filed August 16, 1895, as a division of this application.

What is claimed is—

1. The herein described method of making a mechanical mixture of a metal and an inert non-conducting porous substance, which consists in heating the metal until brought to a molten condition and then while in such condition adding and kneading the inert substance to such metal, whereby the air in said porous substance is expanded and caused to produce air spaces.

2. The herein described method of making an electrode for a battery, which consists in making a mechanical mixture of a molten metal and an inert non-conducting porous substance, and subjecting the mixture to an electric current.

3. The herein described method of making an electrode for a battery, which consists in making a mechanical mixture of molten metallic lead and granulated pumice stone, and subjecting the mixture to an electric current.

JOHN JOHNSON.
JAMES HART ROBERTSON.

Witnesses:
W. H. GRAHAM,
H. N. LOW.